United States Patent
Ogawa

(10) Patent No.: US 11,054,563 B2
(45) Date of Patent: Jul. 6, 2021

(54) POLARIZED WAVE SEPARATION ELEMENT, OPTICAL SYSTEM, AND OPTICAL APPARATUS

(71) Applicant: OLYMPUS CORPORATION, Hachioji (JP)

(72) Inventor: Koichi Ogawa, Hiratsuka (JP)

(73) Assignee: OLYMPUS CORPORATION, Tokyo (JP)

( * ) Notice: Subject to any disclaimer, the term of this patent is extended or adjusted under 35 U.S.C. 154(b) by 236 days.

(21) Appl. No.: 16/221,554

(22) Filed: Dec. 16, 2018

(65) Prior Publication Data

US 2019/0121008 A1 Apr. 25, 2019

Related U.S. Application Data

(63) Continuation of application No. PCT/JP2017/022737, filed on Jun. 20, 2017.

(30) Foreign Application Priority Data

Jul. 1, 2016 (JP) .............................. JP2016-131344

(51) Int. Cl.
G02B 5/30 (2006.01)
G02B 23/26 (2006.01)
(Continued)

(52) U.S. Cl.
CPC ............. *G02B 5/3025* (2013.01); *G02B 5/30* (2013.01); *G02B 23/26* (2013.01);
(Continued)

(58) Field of Classification Search
CPC . G02B 5/3025; G02B 27/1006; G02B 27/283
(Continued)

(56) References Cited

U.S. PATENT DOCUMENTS 4,932,754 A * 6/1990 Haisma .................. B82Y 25/00
359/359
4,966,438 A * 10/1990 Mouchart ............... G02B 27/28
359/489.09
(Continued)

FOREIGN PATENT DOCUMENTS

JP H11167026 A 6/1999
JP 2001051121 A 2/2001
(Continued)

OTHER PUBLICATIONS

International Preliminary Report on Patentability (IPRP) (and English language translation thereof) and Written Opinion dated Jan. 10, 2019 issued in counterpart International Application No. PCT/JP2017/022737.
(Continued)

*Primary Examiner* — Ricky D Shafer
(74) *Attorney, Agent, or Firm* — Holtz, Holtz & Volek PC

(57) ABSTRACT

A polarized wave separation element includes a multilayer film between a first substrate and a second substrate, the multilayer film being formed by alternately stacking a relatively low refractive index substance and a relatively high refractive index. Define a pair of a low refractive index substance layer and a high refractive index substance layer as a stack, half or more than half of stacks in the multilayer film satisfy following conditional expression (1), where an nth stack from the first substrate is named as an nth stack, Ln is an optical film thickness of the low refractive index substance of the nth stack, and Hn is an optical film thickness of the high refractive index substance of the nth stack, H1:L1=Hn:Ln (1), the polarized wave separation element further comprises a plurality of stacks in the multilayer film satisfying following conditional expressions (2a) and (2b): Hn=H1×(a+(n−2)×b) (2a), Ln=L1×(a+(n−2)×b)
(Continued)

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.52 | |
| FIRST STACK | 1 | SiO$_2$ | 1.47 | 0.72 |
| | 2 | Ta$_2$O$_5$ | 2.24 | 0.612 |
| SECOND STACK | 3 | SiO$_2$ | 1.47 | 0.8856 |
| | 4 | Ta$_2$O$_5$ | 2.24 | 0.75276 |
| THIRD STACK | 5 | SiO$_2$ | 1.47 | 1.1736 |
| | 6 | Ta$_2$O$_5$ | 2.24 | 0.99756 |
| FOURTH STACK | 7 | SiO$_2$ | 1.47 | 1.4616 |
| | 8 | Ta$_2$O$_5$ | 2.24 | 1.24236 |
| FIFTH STACK | 9 | SiO$_2$ | 1.47 | 1.57484 |
| | 10 | Ta$_2$O$_5$ | 2.24 | 1.338444 |
| SIXTH STACK | 11 | SiO$_2$ | 1.47 | 1.894968 |
| | 12 | Ta$_2$O$_5$ | 2.24 | 1.853197 |
| SEVENTH STACK | 13 | SiO$_2$ | 1.47 | 2.162808 |
| | 14 | Ta$_2$O$_5$ | 2.24 | 2.115133 |
| EIGHTH STACK | 15 | SiO$_2$ | 1.47 | 2.9016 |
| | 16 | Ta$_2$O$_5$ | 2.24 | 2.46636 |
| | | SUBSTRATE | 1.52 | |

(2b), where a constant a is 1.1 to 1.3, and a constant b is 0.3 to 0.6.

13 Claims, 14 Drawing Sheets

(51) Int. Cl.
    *G02B 27/09* (2006.01)
    *G02B 27/10* (2006.01)
    *G02B 27/28* (2006.01)
(52) U.S. Cl.
    CPC ..... *G02B 27/0955* (2013.01); *G02B 27/1006* (2013.01); *G02B 27/283* (2013.01)
(58) Field of Classification Search
    USPC .................. 359/485.03, 489.08, 489.19, 583
    See application file for complete search history.

(56) References Cited

U.S. PATENT DOCUMENTS

| | | | | |
|---|---|---|---|---|
| 5,076,675 A * | 12/1991 | Kusaka | ................ | G02B 6/4208 359/484.04 |
| 5,453,859 A * | 9/1995 | Sannohe | .............. | G02B 27/283 349/9 |
| 5,579,159 A * | 11/1996 | Ito | ........................ | G02B 5/0825 359/485.03 |
| 6,249,378 B1 * | 6/2001 | Shimamura | .......... | G02B 5/0825 353/20 |
| 8,817,371 B1 * | 8/2014 | Boothroyd | ........... | G02B 27/283 359/485.02 |
| 9,322,965 B2 * | 4/2016 | Osawa | .................... | G02B 5/285 |
| 2002/0024731 A1 * | 2/2002 | Muraguchi | .......... | G02B 5/3025 359/489.19 |
| 2006/0028726 A1 * | 2/2006 | Ushigome | ............ | G02B 27/283 359/489.2 |
| 2007/0115552 A1 * | 5/2007 | Robinson | ............. | H04N 9/3167 359/487.04 |
| 2007/0279554 A1 | 12/2007 | Kowarz et al. | | |

FOREIGN PATENT DOCUMENTS

| | | |
|---|---|---|
| JP | 2009540364 A | 11/2009 |
| JP | 2010152391 A | 7/2010 |

OTHER PUBLICATIONS

Japanese Office Action (and English language translation thereof) dated Jul. 1, 2020 issued in Japanese Application No. 2016-131344.
International Search Report (ISR) dated Sep. 12, 2017 issued in International Application No. PCT/JP2017/022737.
Written Opinion dated Sep. 12, 2017 issued in International Application No. PCT/JP2017/022737.
Japanese Office Action (and English language translation thereof) dated Apr. 3, 2020 issued in Japanese Application No. 2016-131344.

* cited by examiner

FIG. 1

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.52 | |
| FIRST STACK | 1 | $SiO_2$ | 1.47 | 0.72 |
| | 2 | $Ta_2O_5$ | 2.24 | 0.612 |
| SECOND STACK | 3 | $SiO_2$ | 1.47 | 0.8856 |
| | 4 | $Ta_2O_5$ | 2.24 | 0.75276 |
| THIRD STACK | 5 | $SiO_2$ | 1.47 | 1.1736 |
| | 6 | $Ta_2O_5$ | 2.24 | 0.99756 |
| FOURTH STACK | 7 | $SiO_2$ | 1.47 | 1.4616 |
| | 8 | $Ta_2O_5$ | 2.24 | 1.24236 |
| FIFTH STACK | 9 | $SiO_2$ | 1.47 | 1.57464 |
| | 10 | $Ta_2O_5$ | 2.24 | 1.338444 |
| SIXTH STACK | 11 | $SiO_2$ | 1.47 | 1.894968 |
| | 12 | $Ta_2O_5$ | 2.24 | 1.853197 |
| SEVENTH STACK | 13 | $SiO_2$ | 1.47 | 2.162808 |
| | 14 | $Ta_2O_5$ | 2.24 | 2.115133 |
| EIGHTH STACK | 15 | $SiO_2$ | 1.47 | 2.9016 |
| | 16 | $Ta_2O_5$ | 2.24 | 2.46636 |
| | | SUBSTRATE | 1.52 | |

FIG. 4

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.56 | |
| FIRST STACK | 1 | $SiO_2$ | 1.47 | 0.72 |
| | 2 | $Ta_2O_5$ | 2.24 | 0.612 |
| SECOND STACK | 3 | $SiO_2$ | 1.47 | 0.8856 |
| | 4 | $Ta_2O_5$ | 2.24 | 0.75276 |
| THIRD STACK | 5 | $SiO_2$ | 1.47 | 1.1736 |
| | 6 | $Ta_2O_5$ | 2.24 | 0.99756 |
| FOURTH STACK | 7 | $SiO_2$ | 1.47 | 1.4616 |
| | 8 | $Ta_2O_5$ | 2.24 | 1.24236 |
| FIFTH STACK | 9 | $SiO_2$ | 1.47 | 1.7496 |
| | 10 | $Ta_2O_5$ | 2.24 | 1.189728 |
| SIXTH STACK | 11 | $SiO_2$ | 1.47 | 2.261736 |
| | 12 | $Ta_2O_5$ | 2.24 | 1.576084 |
| SEVENTH STACK | 13 | $SiO_2$ | 1.47 | 2.581416 |
| | 14 | $Ta_2O_5$ | 2.24 | 1.798852 |
| EIGHTH STACK | 15 | $SiO_2$ | 1.47 | 2.9016 |
| | 16 | $Ta_2O_5$ | 2.24 | 2.46636 |
| | | SUBSTRATE | 1.56 | |

FIG. 7

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.52 | |
| FIRST STACK | 1 | $SiO_2$ | 1.47 | 0.72 |
| | 2 | $Ta_2O_5$ | 2.24 | 0.612 |
| SECOND STACK | 3 | $SiO_2$ | 1.47 | 0.8856 |
| | 4 | $Ta_2O_5$ | 2.24 | 0.75276 |
| THIRD STACK | 5 | $SiO_2$ | 1.47 | 1.1736 |
| | 6 | $Ta_2O_5$ | 2.24 | 0.99756 |
| FOURTH STACK | 7 | $SiO_2$ | 1.47 | 1.4616 |
| | 8 | $Ta_2O_5$ | 2.24 | 1.24236 |
| FIFTH STACK | 9 | $SiO_2$ | 1.47 | 1.7496 |
| | 10 | $Ta_2O_5$ | 2.24 | 1.48716 |
| SIXTH STACK | 11 | $SiO_2$ | 1.47 | 2.261736 |
| | 12 | $Ta_2O_5$ | 2.24 | 1.576084 |
| SEVENTH STACK | 13 | $SiO_2$ | 1.47 | 2.581416 |
| | 14 | $Ta_2O_5$ | 2.24 | 1.798852 |
| EIGHTH STACK | 15 | $SiO_2$ | 1.47 | 2.9016 |
| | 16 | $Ta_2O_5$ | 2.24 | 2.46636 |
| | | SUBSTRATE | 1.52 | |

FIG.10

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.58 | |
| FIRST STACK | 1 | $SiO_2$ | 1.47 | 0.72 |
| | 2 | $Ta_2O_5$ | 2.24 | 0.612 |
| SECOND STACK | 3 | $SiO_2$ | 1.47 | 0.8856 |
| | 4 | $Ta_2O_5$ | 2.24 | 0.75276 |
| THIRD STACK | 5 | $SiO_2$ | 1.47 | 1.1736 |
| | 6 | $Ta_2O_5$ | 2.24 | 0.99756 |
| FOURTH STACK | 7 | $SiO_2$ | 1.47 | 1.4616 |
| | 8 | $Ta_2O_5$ | 2.24 | 1.24236 |
| FIFTH STACK | 9 | $SiO_2$ | 1.47 | 1.57464 |
| | 10 | $Ta_2O_5$ | 2.24 | 1.338444 |
| SIXTH STACK | 11 | $SiO_2$ | 1.47 | 1.894968 |
| | 12 | $Ta_2O_5$ | 2.24 | 1.853197 |
| SEVENTH STACK | 13 | $SiO_2$ | 1.47 | 2.162808 |
| | 14 | $Ta_2O_5$ | 2.24 | 2.115133 |
| EIGHTH STACK | 15 | $SiO_2$ | 1.47 | 2.9016 |
| | 16 | $Ta_2O_5$ | 2.24 | 2.46636 |
| | | SUBSTRATE | 1.58 | |

FIG.13

| REFERENCE WAVELENGTH (nm): | | | | 450 |
|---|---|---|---|---|
| INCIDENT ANGLE (°): | | | | 35~60 |
| NUMBER OF STACKS | NUMBER OF LAYERS | FILM FORMATION SUBSTANCE | REFRACTIVE INDEX ni | OPTICAL FILM THICKNESS (QWOT) |
| | | SUBSTRATE | 1.65 | |
| FIRST STACK | 1 | $SiO_2$ | 1.47 | 0.72 |
| | 2 | $Ta_2O_5$ | 2.24 | 0.612 |
| SECOND STACK | 3 | $SiO_2$ | 1.47 | 0.8856 |
| | 4 | $Ta_2O_5$ | 2.24 | 0.75276 |
| THIRD STACK | 5 | $SiO_2$ | 1.47 | 1.1736 |
| | 6 | $Ta_2O_5$ | 2.24 | 0.99756 |
| FOURTH STACK | 7 | $SiO_2$ | 1.47 | 1.4616 |
| | 8 | $Ta_2O_5$ | 2.24 | 1.24236 |
| FIFTH STACK | 9 | $SiO_2$ | 1.47 | 1.57464 |
| | 10 | $Ta_2O_5$ | 2.24 | 1.338444 |
| SIXTH STACK | 11 | $SiO_2$ | 1.47 | 1.894968 |
| | 12 | $Ta_2O_5$ | 2.24 | 1.853197 |
| SEVENTH STACK | 13 | $SiO_2$ | 1.47 | 2.162808 |
| | 14 | $Ta_2O_5$ | 2.24 | 2.115133 |
| EIGHTH STACK | 15 | $SiO_2$ | 1.47 | 2.9016 |
| | 16 | $Ta_2O_5$ | 2.24 | 2.46636 |
| | | SUBSTRATE | 1.65 | |

POLARIZED WAVE SEPARATION ELEMENT, OPTICAL SYSTEM, AND OPTICAL APPARATUS

CROSS-REFERENCE TO RELATED APPLICATION

The present application is a continuation application of PCT/JP2017/022737 filed on Jun. 20, 2017 which is based upon and claims the benefit of priority from Japanese Patent Application No. 2016-131344 filed on Jul. 1, 2016; the entire contents of which are incorporated herein by reference.

BACKGROUND OF THE INVENTION

Field of the Invention

The present invention relates to a polarized wave separation element, an optical system, and an optical apparatus.

Description of the Related Art

In conventional art, polarized wave separation elements using a dielectric multilayer film are known. In addition, a structure dealing with a wide incident angle and using a dielectric multilayer film is, for example, presented in Japanese laid-open Publication No. 2010-152391

SUMMARY OF THE INVENTION

A polarized wave separation element according to at least some embodiments of the present invention is a polarized wave separation element includes a multilayer film between a first substrate and a second substrate, the multilayer film being formed by alternately stacking a relatively low refractive index substance and a relatively high refractive index, wherein defining a pair of a low refractive index substance layer and a high refractive index substance layer adjacent to the low refractive index substance layer a stack, and half or more than half of stacks in the multilayer film satisfy following conditional expression (1), where an n-th stack from the first substrate as an n-th stack, Ln is an optical film thickness of the low refractive index substance of the n-th stack, and Hn is an optical film thickness of the high refractive index substance of the n-th stack, $$H1:L1 = Hn:Ln \quad (1).$$

the polarized wave separation element further comprises a plurality of stacks in the multilayer film satisfying following conditional expressions (2a) and (2b):

$$Hn = H1 \times (a + (n-2) \times b) \quad (2a)$$

$$Ln = L1 \times (a + (n-2) \times b) \quad (2b)$$

where a constant a is 1.1 to 1.3, and
a constant b is 0.3 to 0.6.

BRIEF DESCRIPTION OF THE DRAWINGS

FIG. 1 is a diagram illustrating a layer structure of a polarized wave separation element according to a first example;

FIG. 4 is a diagram illustrating a layer structure of a polarized wave separation element according to a second example;

FIG. 7 is a diagram illustrating a layer structure of a polarized wave separation element according to a third example;

FIG. 10 is a diagram illustrating a layer structure of a polarized wave separation element according to a fourth example;

FIG. 13 is a diagram illustrating a layer structure of a polarized wave separation element according to a fifth example;

DETAILED DESCRIPTION OF THE INVENTION

Figure 2:
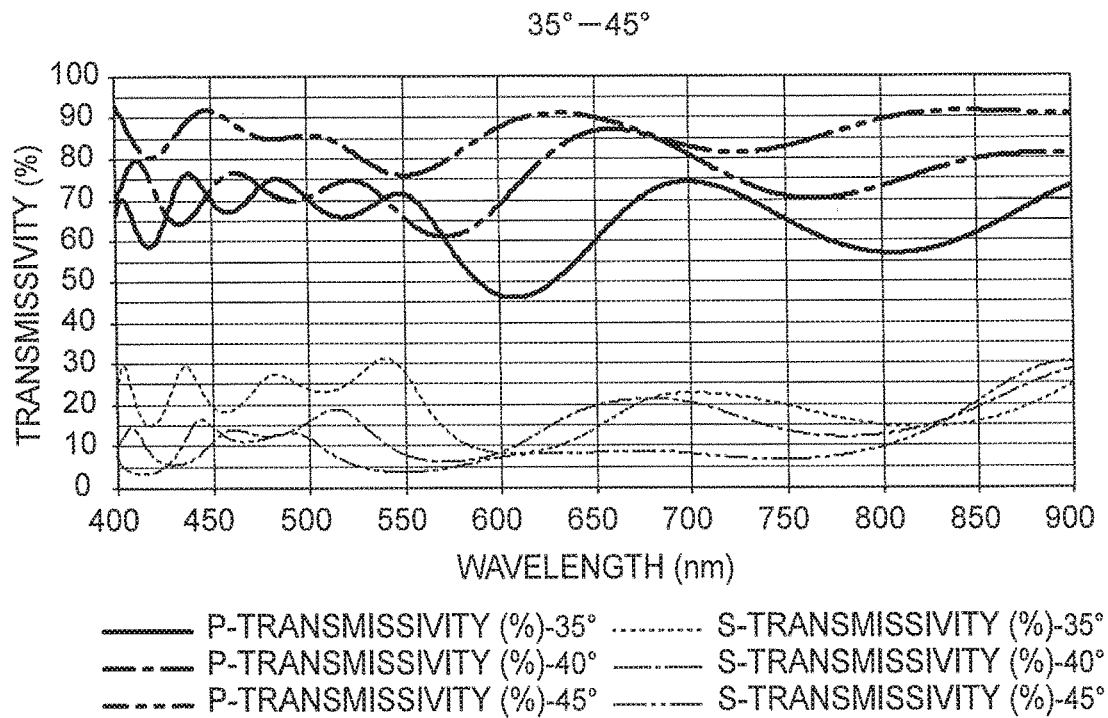
FIG. 2 is a diagram illustrating transmissivity characteristics of the polarized wave separation element according to the first example.

The following is a detailed explanation of a polarized wave separation element, an optical system, and an optical apparatus according to an embodiment of the present invention with reference to the drawings. The present invention is not limited with the embodiment.

A polarized wave separation element according to an embodiment of the present invention is a polarized wave separation element including a multilayer film between a first substrate and a second substrate, the multilayer film being formed by alternately stacking a relatively low refractive index substance and a relatively high refractive index, wherein defining a pair of a low refractive index substance layer and a high refractive index substance layer adjacent to the low refractive index substance layer as a stack, and half or more than half of stacks in the multilayer film satisfy following conditional expression (1), where an n-th stack from the first substrate is named as an n-th stack, Ln is an optical film thickness of the low refractive index substance of the n-th stack, and Hn is an optical film thickness of the high refractive index substance of the n-th stack, $$H1:L1=Hn:Ln \quad (1).$$

The first substrate and the second substrate are preferably translucent substrates. For example, the translucent substrates are parallel flat plates having translucency. The first substrate and the second substrate are not limited to flat plates, but also include a reflection prism and a transmission prism.

Hereinafter, the multilayer film is properly referred to as a stacked film.

The conditional expression (1) indicates that the ratio of Hn to Ln is constant in half or more than half of stacks. In this manner, when the n-th stack described above serves as one unit, it is possible to unify the magnitude of amplitude of the incident light in each stack unit.

In addition, according to a preferred mode of the present embodiment, it is desirable to further include a plurality of stacks in a multilayer film satisfying following conditional expressions (2a) and (2b):

$$Hn=H1\times(a+(n-2)\times b) \quad (2a)$$

$$Ln=L1\times(a+(n-2)\times b) \quad (2b)$$

where a constant a is 1.1 to 1.3, and
a constant b is 0.3 to 0.6.

The conditional expressions (2a) and (2b) serve as a pattern of Hn and Ln in a plurality of patterns of Hn and Ln enabling shift of the period of the amplitude of the incident light with the conditional expression (1), and have a meaning of canceling the waves of the characteristics and flattening the whole characteristics. In particular, it is desirable to apply the conditional expressions (2a) and (2b) to a second, a third, and a fourth stacks in the examples described later. In the examples, a is 1.23, and b is 0.4. By applying the conditional expressions (2a) and (2b) to the second, the third, and the fourth stacks in the examples described later, it is possible to determine Hn and Ln of the second, the third, and the fourth stacks merely by determining the constants a and b.

In addition, according to a preferred mode of the present embodiment, it is desirable to further include a stack satisfying following conditional expressions (3a) and (3b):

$$Hn=H1\times(a+(n-2)\times b)\times c1 \quad (3a)$$

$$Ln=L1\times(a+(n\times 2)\times b)\times c2 \quad (3b)$$

where each of the constants c1 and c2 is 0.8 to 1.
The meanings and the ranges of the constants a and b are similar to those described above, and so omitted herein.

The conditional expressions (3a) and (3b) are a pattern of Hn and Ln different from the conditional expressions (2a) and (2b) in a plurality of patterns of Hn and Ln enabling shift of the period of the amplitude of the incident light with the conditional expression (1), and have a meaning of canceling the waves of the characteristics and flattening the whole characteristics.

In particular, it is desirable to correspond the conditional expressions (3a) and (3b) to a fifth stack in the examples described later. The examples include the case where each of c1 and c2 is 0.9, the case where c1 is 0.8 and c2 is 1, and the case where each of c1 and c2 is 1. By applying the conditional expressions (3a) and (3b) to the fifth stack of the examples described later, it is possible to determine Hn and Ln of the fifth stack by merely determining the constants c1 and c2.

In addition, according to a preferred mode of the present embodiment, it is desirable to further include a stack satisfying following conditional expressions (4a) and (4b):

$$Hn=H1\times(a+(n-2)\times b)\times d1 \quad (4a)$$

$$Ln=L1\times(a+(n-2)\times b)\times d2 \quad (4b)$$

where each of the constants d1 and d2 is equal to or larger than 0.7 and smaller than 1.2, and "d1≠d2" and "1.8<d1+d2<2.2" hold.

The meanings and the ranges of the constants a and b are similar to those described above, and so omitted herein.

The conditional expressions (4a) and (4b) are a pattern of Hn and Ln different from the patterns of Hn and Ln acquired by the conditional expressions (2a), (2b), (3a), and (3b) in a plurality of patterns of Hn and Ln enabling shift of the period of the amplitude of the incident light with the conditional expression (1), and have a meaning of canceling the waves of the characteristics and flattening the whole characteristics.

In particular, it is desirable to correspond the conditional expressions (4a) and (4b) to a sixth and a seventh stacks in the examples described later.

In addition, according to a preferred mode of the present embodiment, it is desirable to further include a stack satisfying following conditional expression (5):

$$Hn=H1\times(a+(n-2)\times b) \quad (5)$$

The meanings and the ranges of the constants a and b are similar to those described above, and so omitted herein.

The conditional expression (5) is a pattern of Hn and Ln different from the patterns of Hn and Ln acquired by the conditional expressions (2a), (2b), (3a), (3b), (4a), and (4b) in a plurality of patterns of Hn and Ln enabling shift of the period of the amplitude of the incident light with the conditional expression (1), and have a meaning of canceling the waves of the characteristics and flattening the whole characteristics.

In particular, it is desirable to correspond the conditional expression (5) to an eighth stack in the examples described later.

In addition, in a preferred mode of the present embodiment, the multilayer film preferably includes eight stacks of the first stack, the second stack, the third stack, the fourth stack, the fifth stack, the sixth stack, the seventh stack, and the eighth stack that are stacked in order from the first substrate, the second stack, the third stack, the fourth stack, the fifth stack, and the eighth stack satisfy the conditional expression (1), the second stack, the third stack, and the fourth stack satisfy the following conditional expressions (2a) and (2b), $$Hn=H1\times(a+(n-2)\times b) \quad (2a)$$

$$Ln=L1\times(a+(n-2)\times b) \quad (2b)$$

where the constant a is 1.1 to 1.3, and the constant b is 0.3 to 0.6, the fifth stack satisfies the following conditional expressions (3a) and (3b), $$Hn=H1\times(a+(n-2)\times b)\times c1 \quad (3a)$$

$$Ln=L1\times(a+(n-2)\times b)\times c2 \quad (3b)$$

where each of the constants c1 and c2 is 0.8 to 1, the sixth stack and the seventh stack satisfy the following conditional expressions (4a) and (4b), $$Hn = H1 \times (a+(n-2) \times b) \times d1 \quad (4a)$$

$$Ln = L1 \times (a+(n-2) \times b) \times d2 \quad (4b)$$

where each of the constants d1 and d2 is equal to or larger than 0.7 and smaller than 1.2, and "d1≠d2" and "1.8<d1+d2<2.2" hold, and the eighth stack satisfies the following conditional expression (5):

$$Hn = H1 \times (a+(n-1) \times b) \quad (5)$$

In this manner, it is possible to acquire a polarized wave separation element including eight stacks.

In addition, according to a preferred mode of the present embodiment, the constant a is preferably 1.23. In this manner, it is possible to acquire a more proper polarized wave separation element.

In addition, according to a preferred mode of the present embodiment, it is preferable to include a layer of a film thickness different from the ratio specified in the conditional expressions described above, in the layers contacting the first substrate and the second substrate and the multilayer film structure in which two types of dielectrics of the high refractive index substance and the low refractive index substance are stacked.

In addition, according to a preferred mode of the present embodiment, it is preferable to include a layer of another high refractive index substance and another low refractive index substance having respective refractive indexes different from the refractive indexes of the two types of the high refractive index substance and the low refractive index substance forming the multilayer film structure, in the layers contacting the first substrate and the second substrate and the multilayer film structure in which two types of dielectrics of the high refractive index substance and the low refractive index substance are stacked.

In addition, according to a preferred mode of the present embodiment, it is preferable that the multilayer film has a structure in which two types of dielectrics of the high refractive index substance and the low refractive index substance are stacked between a pair of the first substrate and the second substrate, transmissivity Tp of a P-polarized light component and transmissivity Ts of an S-polarized light component at an incident angle of 35° to 60° in the multilayer film structure have a relation of Tp>Ts, and a difference between the transmissivity Tp and the transmissivity Ts be 30% or more.

In addition, according to a preferred mode of the present embodiment, it is preferable that the multilayer film has a structure in which two types of dielectrics of the high refractive index substance and the low refractive index substance are stacked between a pair of the first substrate and the second substrate, the transmissivity Tp of the P-polarized light component and the transmissivity Ts of the S-polarized light component at an incident angle of 35° to 60° in the multilayer film structure have a relation of Tp>Ts, a difference between the transmissivity Tp and the transmissivity Ts be 30% or more, and the multilayer film structure have a continuous wavelength range of 200 nm or more in which a difference in level of the transmissivity within a wavelength range of 100 nm is 35% or lower in each of the transmissivity Ts and the transmissivity Tp.

In addition, according to a preferred mode of the present embodiment, it is preferable that a the multilayer film has a structure in which two or more types of dielectrics of the high refractive index substance and the low refractive index substance are stacked between a pair of the first substrate and the second substrate, and a bonding agent exist between a surface of one of the pair of the first substrate and the second substrate.

As the bonding agent, an ultraviolet-curing adhesive or a thermosetting adhesive may be used, as long as it transmits light of the wavelength to be used. As another example, bonding may be performed by optical contact (vacuum bonding), without an adhesive.

In addition, according to a preferred mode of the present embodiment, it is preferable that each of the first substrate and the second substrate transparent with respect to target light be selected from optical glass, a semiconductor substrate, a synthetic resin, and the like. Examples of the substrates include non-alkali glass, borosilicate glass, quartz glass, crystal, BSL7 (tradename, manufactured by OHARA INC.), Tempax (tradename, manufactured by SCHOTT AG), and a crystal material such as sapphire.

In addition, according to a preferred mode of the present embodiment, it is preferable that at least two materials be selected from $TiO$, $TiO_2$, $Y_2O_3$, $Ta_2O_5$, $ZrO$, $ZrO_2$, $Si$, $SiO_2$, $HfO_2$, $Ge$, $Nb_2O_5$, $Nb_2O_6$, $CeO_2$, $Cef_3$, $ZnS$, $ZnO$, $Fe_2O_3$, $MgF_2$, $AlF_3$, $CaF_2$, $LiF$, $Na_3AlF_6$, $Na_5AL_3F_{14}$, $Al_2O_3$, $MgO$, $LaF$, $PbF_2$, $NdF_3$, and a mixture thereof, as materials of the dielectrics of the high refractive index substance and the low refractive index substance.

In addition, according to a preferred mode of the present embodiment, a method for stacking two or more dielectrics of a high refractive index substance and a low refractive index substance is preferably one of physical vapor deposition (PVD), such as vacuum deposition, sputtering, and ion plating, resistance heating deposition, electron beam (EB) heating deposition, high-frequency heating deposition, laser beam heating deposition, ionization sputtering, ion beam sputtering, plasma sputtering, ion assisted or radical assisted sputtering.

In addition, an optical system according to another embodiment preferably includes the polarized wave separation element described above.

In addition, an optical apparatus according to another embodiment preferably includes the optical system described above.

The polarized wave separation element according to the present embodiment is preferably used for an objective optical system for an endoscope. The polarized light separation element is not limited thereto, but is also applicable to, for example, an objective lens for a microscope, a lens for a camera, eyeglasses, or a telescope, a prism, or a filter. The optical apparatus according to the present embodiment is, for example, an optical apparatus thereof, and the optical system according to the present embodiment is, for example, an optical system included in these optical apparatuses.

It is not necessary to accurately satisfy each of the conditional expressions described above, and a person carrying out the present invention can properly set a tolerance, in view of the performance required for the polarized wave separation element and the manufacturing error, as a matter of course. For example, according to the inventors' trial calculation, a polarized wave separation element with an error of 5% was practicable, and a polarized wave separation element with an error of 3% achieved good characteristics. However, in the case where particularly high accuracy is required, a polarized wave separation element with an error of 1% or less is preferable.

First Example

Figure 3:
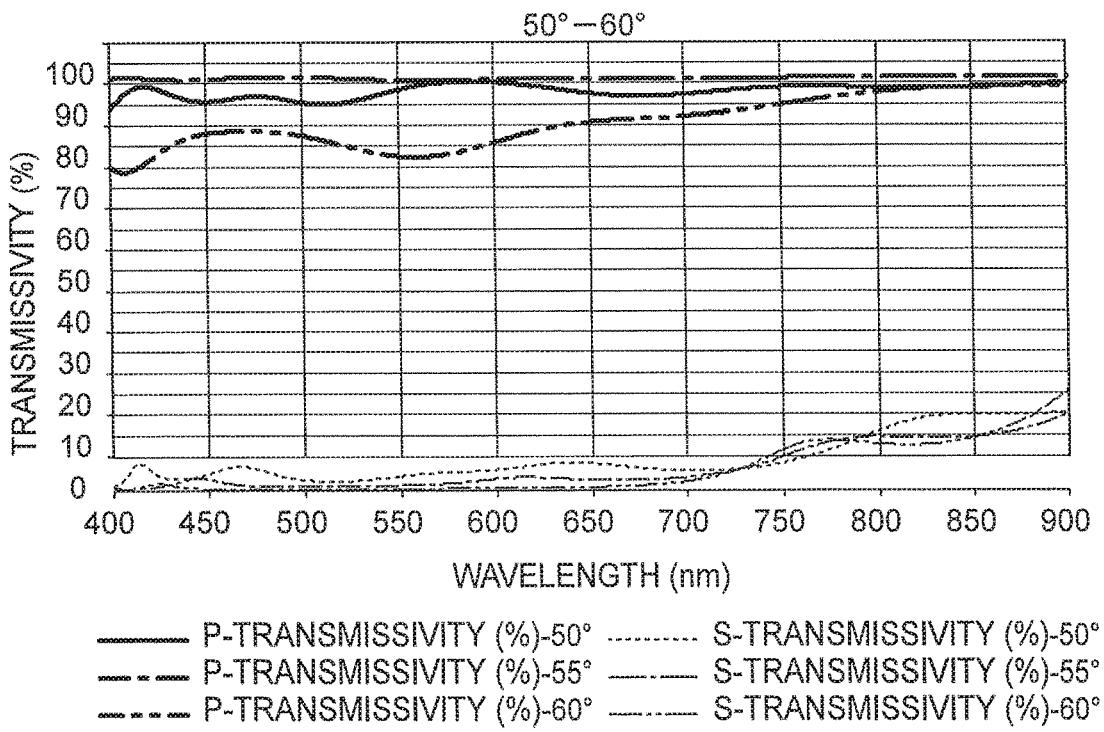
FIG. 3 is another diagram illustrating transmissivity characteristics of the polarized wave separation element according to the first example.

FIG. 1 is a table illustrating a layer configuration of a polarized wave separation element according to a first example. The optical film thickness is expressed with an expression "$\lambda/4=1.0$ (QWOT)", when $\lambda$ is a reference wavelength. FIG. 2 and FIG. 3 are diagrams illustrating transmissivity characteristics of the polarized wave separation element according to the first example. Hereinafter, in the diagrams illustrating transmissivity characteristics, the horizontal axis indicates the wavelength, and the vertical axis indicates the transmissivity.

FIG. 1 illustrates the optical film thickness of each of the layers. FIG. 2 illustrates the transmissivities of S-polarized light and the transmissivities of P-polarized light at incident angles of 35°, 40°, and 45°, in the case where the refractive index ni of the substrate is 1.52 in the present example.

FIG. 3 illustrates the transmissivities of S-polarized light and the transmissivities of P-polarized light at incident angles of 50°, 55°, and 60° in the present example.

As illustrated in FIG. 1, the polarized wave separation element according to the present example is a stacked structure of alternately stacked 16 layers and including a multilayer film formed by alternately stacking $SiO_2$ (refractive index nL=1.47) serving as a low refractive index substance and $Ta_2O_5$ (refractive index nH=2.24) serving as a high refractive index substance on a substrate.

$Ta_2O_5$ serving as the high refractive index substance is disposed in the second, the fourth, the sixth, the eighth, the tenth, the twelfth, the fourteenth, and the sixteenth layers in order from the upper substrate side illustrated in FIG. 1. $SiO_2$ serving as the low refractive index substance is disposed in the first, the third, the fifth, the seventh, the ninth, the eleventh, the thirteenth, and the fifteenth layers.

In order from the substrate, the first stack includes the first layer and the second layer. The second stack includes the third layer and the fourth layer. The third stack includes the fifth layer and the sixth layer. The fourth stack includes the seventh layer and the eighth layer. The fifth stack includes the ninth layer and the tenth layer. The sixth stack includes the eleventh layer and the twelfth layer. The seventh stack includes the thirteenth layer and the fourteenth layer. The eighth stack includes the fifteenth layer and the sixteenth layer. The present example includes eight stacks.

Suppose that the n-th (n is an integer of 1 to 8) stack is the n-th stack, Ln is the optical film thickness of the low refractive index substance of the n-th stack, and Hn is the optical film thickness of the high refractive index substance of the n-th stack. Half or more than half of the stacks of the multilayer film satisfy the following conditional expression (1)

$$H1:L1=Hn:Ln \quad (1)$$

where a ratio of H to L of the first stack is 0.85.

When the polarized wave separation element is designed, first, H1, L1, and the constants a, b, c1, c2, d1, and d2 are set as the initial parameters. Whereby, the second, the third, and the fourth stacks are calculated on the basis of the conditional expressions (2a) and (2b). The fifth stack is calculated on the basis of the conditional expressions (3a) and (3b). The sixth and the seventh stacks are calculated on the basis of the conditional expressions (4a) and (4b). The eighth stack is calculated on the basis of the conditional expression (5).

As described above, by merely setting H1 and L1 and the constants as the initial parameters, it is possible to easily design the film to the sixteenth layer without requiring any structural birefringent layer. In addition, as illustrated in FIG. 2 and FIG. 3, the structure produces the effect that good characteristics dealing with a wider incident angle are acquired with a simple multilayer film (stacked film) at a wavelength region of 400 nm to 900 nm.

The process of calculation of the layers of the polarized wave separation element explained in the present example is the same also in the second to the fifth examples. For this reason, an overlapping explanation will be omitted hereinafter.

Second Example

Figure 5:
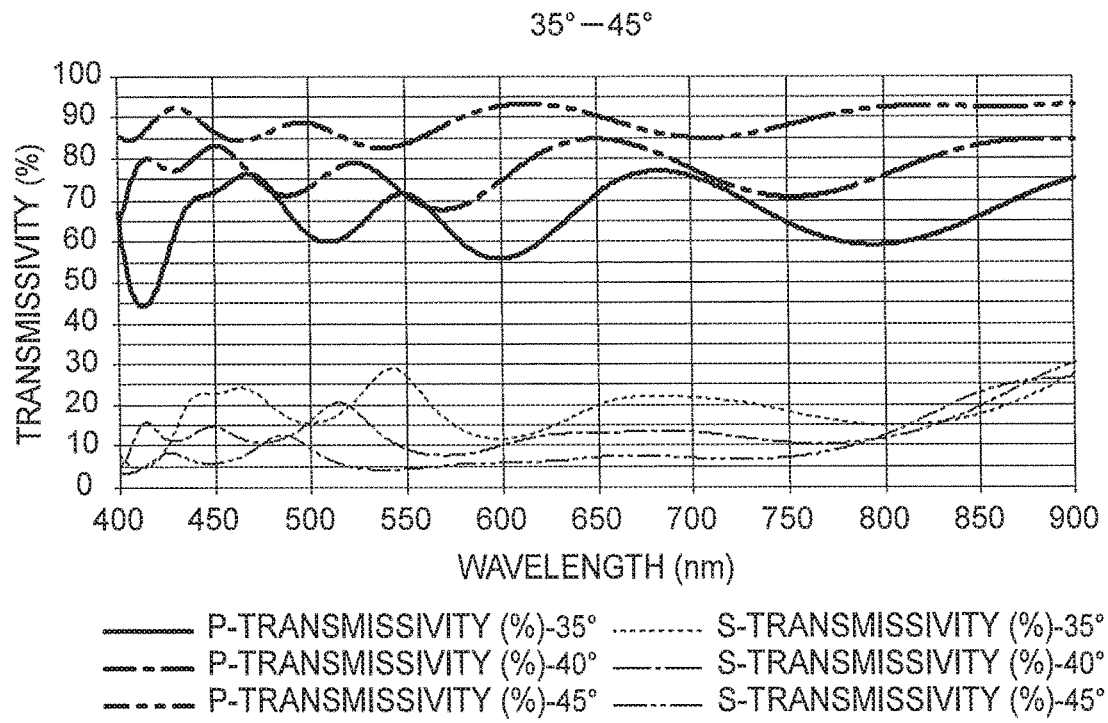
FIG. 5 is a diagram illustrating transmissivity characteristics of the polarized wave separation element according to the second example.

The following is an explanation of a second example. FIG. 4 illustrates the optical film thicknesses of the respective layers. FIG. 5 illustrates transmissivities of S-polarized light and the transmissivities of P-polarized light at incident angles of 35°, 40°, and 45° when the refractive index ni of the substrate is 1.56 in the present example.

Figure 6:
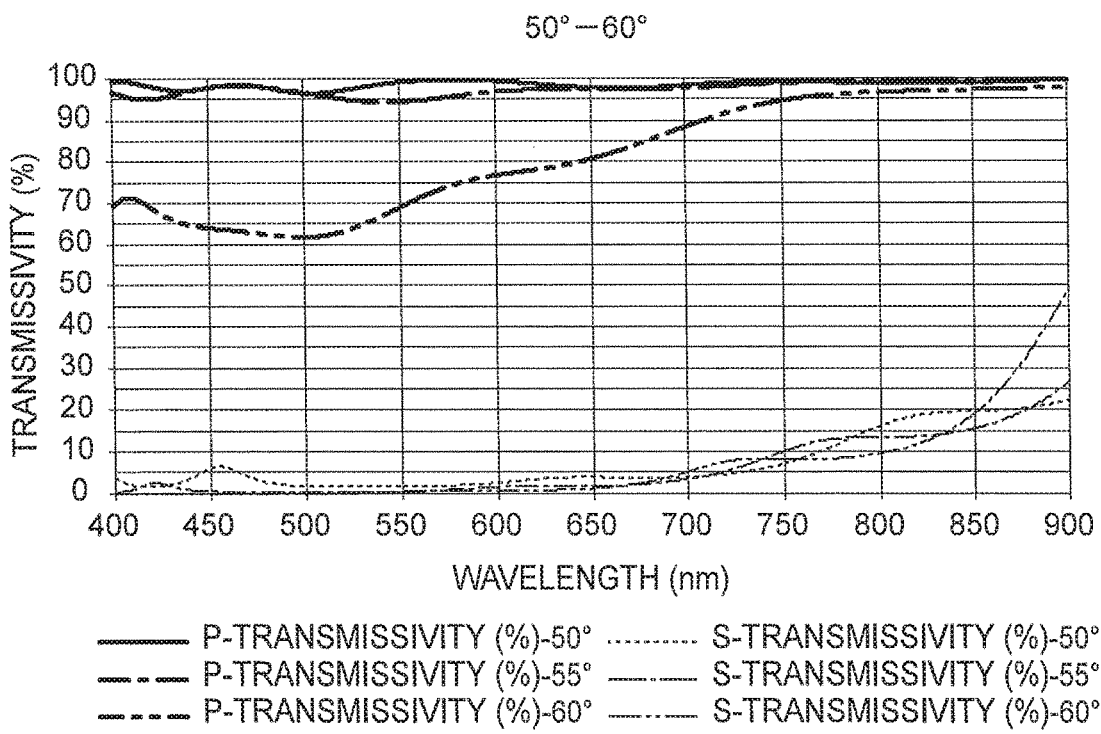
FIG. 6 is another diagram illustrating transmissivity characteristics of the polarized wave separation element according to the second example.

FIG. 6 illustrates transmissivities of S-polarized light and the transmissivities of P-polarized light at incident angles of 50°, 55°, and 60° in the present example.

As illustrated in FIG. 4, the polarized wave separation element according to the present example is a stacked structure of alternately stacked 16 layers and including a multilayer film formed by alternately stacking $SiO_2$ (refractive index nL=1.47) serving as a low refractive index substance and $Ta_2O_5$ (refractive index nH=2.24) serving as a high refractive index substance on a substrate.

$Ta_2O_5$ serving as the high refractive index substance is disposed in the second, the fourth, the sixth, the eighth, the tenth, the twelfth, the fourteenth, and the sixteenth layers in order from the upper substrate side illustrated in FIG. 4. $SiO_2$ serving as the low refractive index substance is disposed in the first, the third, the fifth, the seventh, the ninth, the eleventh, the thirteenth, and the fifteenth layers.

In order from the substrate, the first stack includes the first layer and the second layer. The second stack includes the third layer and the fourth layer. The third stack includes the fifth layer and the sixth layer. The fourth stack includes the seventh layer and the eighth layer. The fifth stack includes the ninth layer and the tenth layer. The sixth stack includes the eleventh layer and the twelfth layer. The seventh stack includes the thirteenth layer and the fourteenth layer. The eighth stack includes the fifteenth layer and the sixteenth layer. The present example includes eight stacks.

A ratio of H to L of the first stack is 0.85.

As described above, by merely setting L1 and the constants as the initial parameters, it is possible to easily design the film to the sixteenth layer without requiring any structural birefringent layer. In addition, as illustrated in FIG. 5 and FIG. 6, the structure produces the effect that good characteristics dealing with a wider incident angle are acquired with a simple multilayer film (stacked film) at a wavelength region of 400 nm to 900 nm.

Third Example

Figure 8:
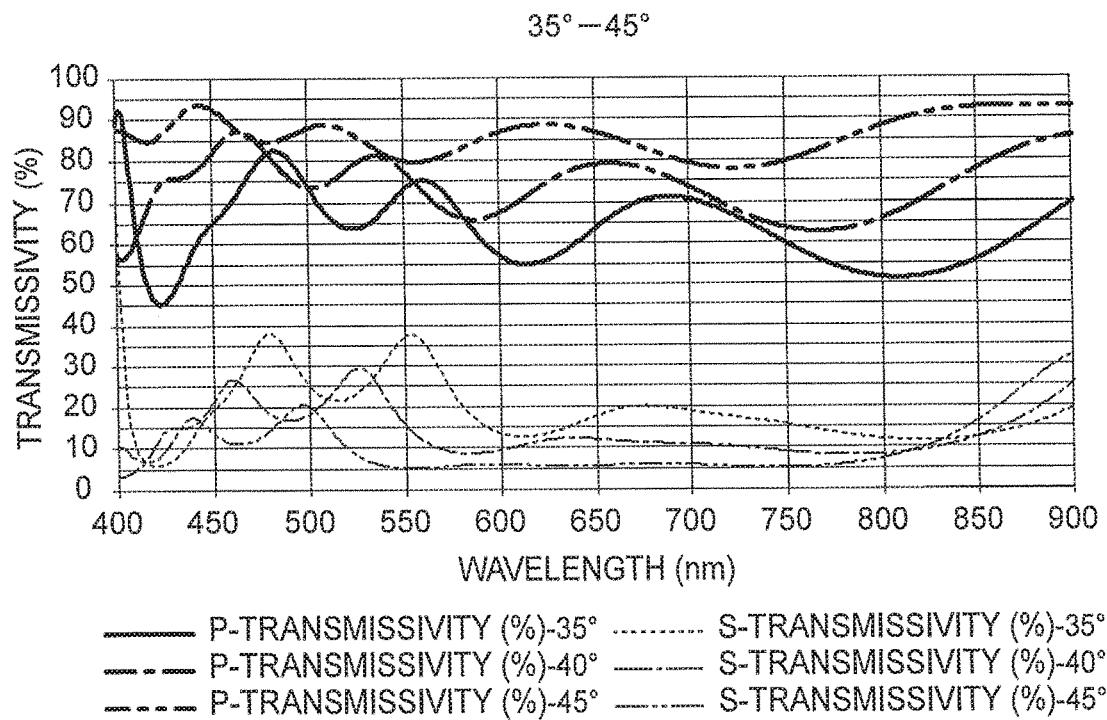
FIG. 8 is a diagram illustrating transmissivity characteristics of the polarized wave separation element according to the third example.

The following is an explanation of a third example. FIG. 7 illustrates the optical film thicknesses of the respective layers. FIG. 8 illustrates transmissivities of S-polarized light and the transmissivities of P-polarized light at incident angles of 35°, 40°, and 45° when the refractive index ni of the substrate is 1.52 in the present example.

Figure 9:
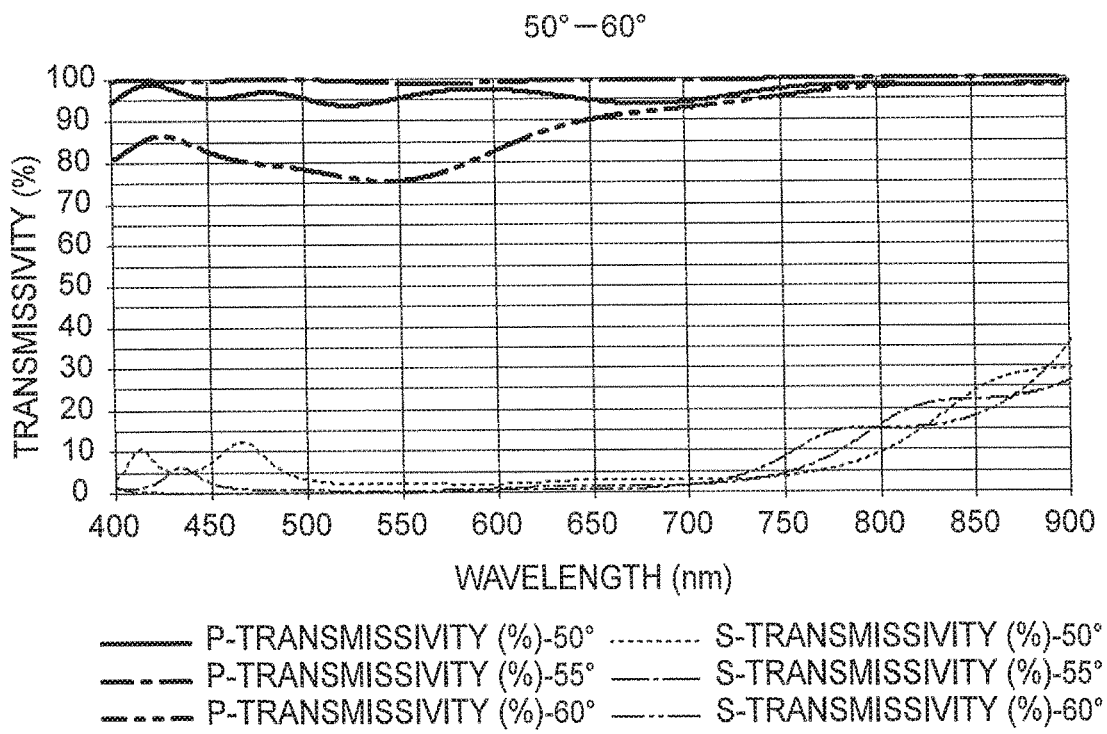
FIG. 9 is another diagram illustrating transmissivity characteristics of the polarized wave separation element according to the third example.

FIG. 9 illustrates transmissivities of S-polarized light and the transmissivities of P-polarized light at incident angles of 50°, 55°, and 60° in the present example.

As illustrated in FIG. 7, the polarized wave separation element according to the present example is a stacked structure of alternately stacked 16 layers and including a multilayer film formed by alternately stacking $SiO_2$ (refractive index nL=1.47) serving as a low refractive index substance and $Ta_2O_5$ (refractive index nH=2.24) serving as a high refractive index substance on a substrate.

$Ta_2O_5$ serving as the high refractive index substance is disposed in the second, the fourth, the sixth, the eighth, the tenth, the twelfth, the fourteenth, and the sixteenth layers in order from the upper substrate side illustrated in FIG. 7. $SiO_2$ serving as the low refractive index substance is disposed in the first, the third, the fifth, the seventh, the ninth, the eleventh, the thirteenth, and the fifteenth layers.

In order from the substrate, the first stack includes the first layer and the second layer. The second stack includes the third layer and the fourth layer. The third stack includes the fifth layer and the sixth layer. The fourth stack includes the seventh layer and the eighth layer. The fifth stack includes the ninth layer and the tenth layer. The sixth stack includes the eleventh layer and the twelfth layer. The seventh stack includes the thirteenth layer and the fourteenth layer. The eighth stack includes the fifteenth layer and the sixteenth layer. The present example includes eight stacks.

A ratio of H to L of the first stack is 0.85.

As described above, by merely setting L1 and the constants as the initial parameters, it is possible to easily design the film to the sixteenth layer without requiring any structural birefringent layer. In addition, as illustrated in FIG. 8 and FIG. 9, the structure produces the effect that good characteristics dealing with a wider incident angle are acquired with a simple multilayer film (stacked film) at a wavelength region of 400 nm to 900 nm.

Fourth Example

Figure 11:
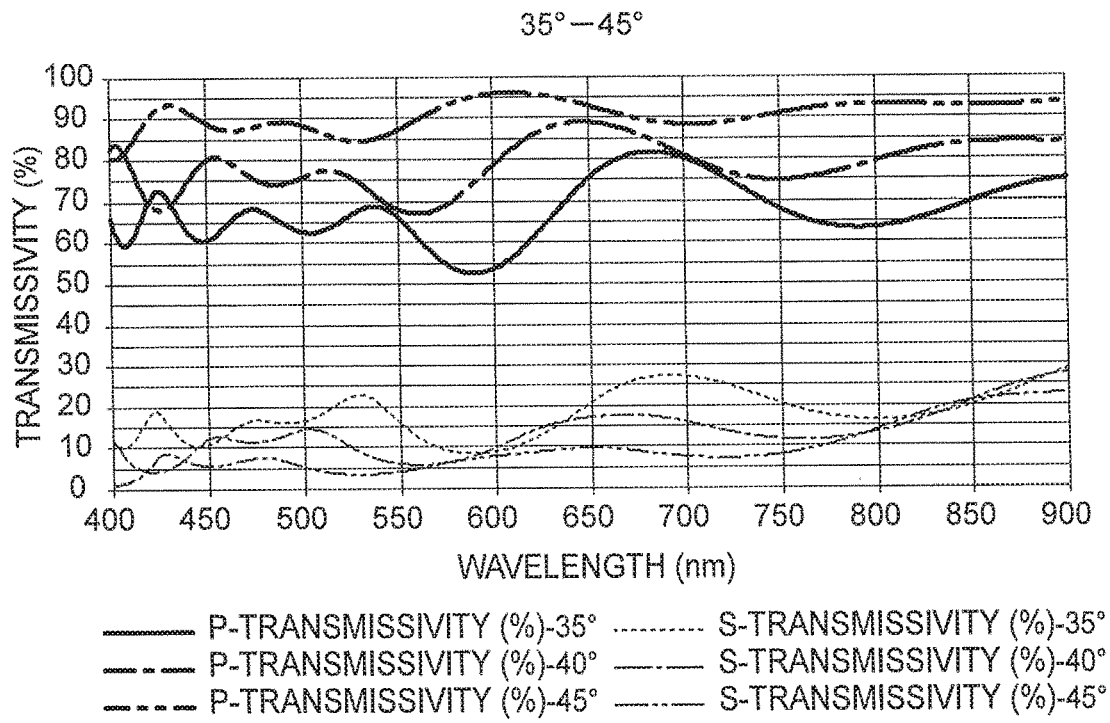
FIG. 11 is a diagram illustrating transmissivity characteristics of the polarized wave separation element according to the fourth example.

The following is an explanation of a fourth example. FIG. 10 illustrates the optical film thicknesses of the respective layers. FIG. 11 illustrates transmissivities of S-polarized light and the transmissivities of P-polarized light at incident angles of 35°, 40°, and 45° when the refractive index ni of the substrate is 1.58 in the present example.

Figure 12:
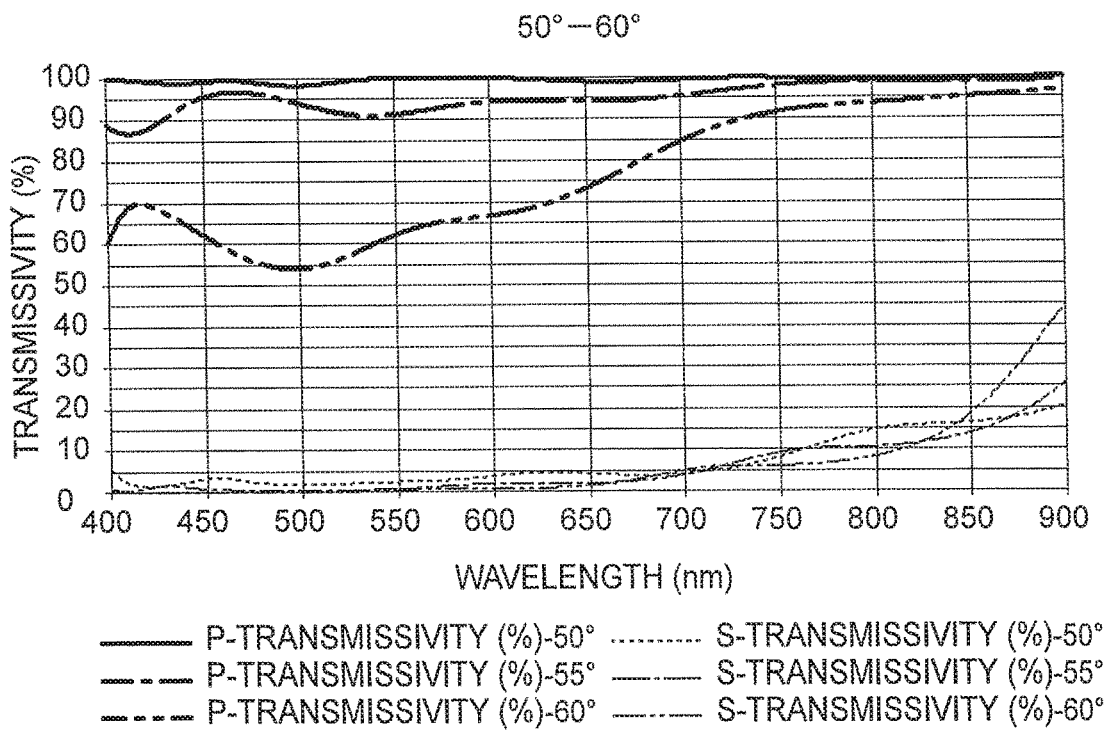
FIG. 12 is another diagram illustrating transmissivity characteristics of the polarized wave separation element according to the fourth example.

FIG. 12 illustrates transmissivities of S-polarized light and the transmissivities of P-polarized light at incident angles of 50°, 55°, and 60° in the present example.

As illustrated in FIG. 10, the polarized wave separation element according to the present example is a stacked structure of alternately stacked 16 layers and including a multilayer film formed by alternately stacking $SiO_2$ (refractive index nL=1.47) serving as a low refractive index substance and $Ta_2O_5$ (refractive index nH=2.24) serving as a high refractive index substance on a substrate.

$Ta_2O_5$ serving as the high refractive index substance is disposed in the second, the fourth, the sixth, the eighth, the tenth, the twelfth, the fourteenth, and the sixteenth layers in order from the upper substrate side illustrated in FIG. 10. $SiO_2$ serving as the low refractive index substance is disposed in the first, the third, the fifth, the seventh, the ninth, the eleventh, the thirteenth, and the fifteenth layers.

In order from the substrate, the first stack includes the first layer and the second layer. The second stack includes the third layer and the fourth layer. The third stack includes the fifth layer and the sixth layer. The fourth stack includes the seventh layer and the eighth layer. The fifth stack includes the ninth layer and the tenth layer. The sixth stack includes the eleventh layer and the twelfth layer. The seventh stack includes the thirteenth layer and the fourteenth layer. The eighth stack includes the fifteenth layer and the sixteenth layer. The present example includes eight stacks.

A ratio of H to L of the first stack is 0.85.

As described above, by merely setting L1 and the constants as the initial parameters, it is possible to easily design the film to the sixteenth layer without requiring any structural birefringent layer. In addition, as illustrated in FIG. 11 and FIG. 12, the structure produces the effect that good characteristics dealing with a wider incident angle are acquired with a simple multilayer film (stacked film) at a wavelength region of 400 nm to 900 nm.

Fifth Example

Figure 14:
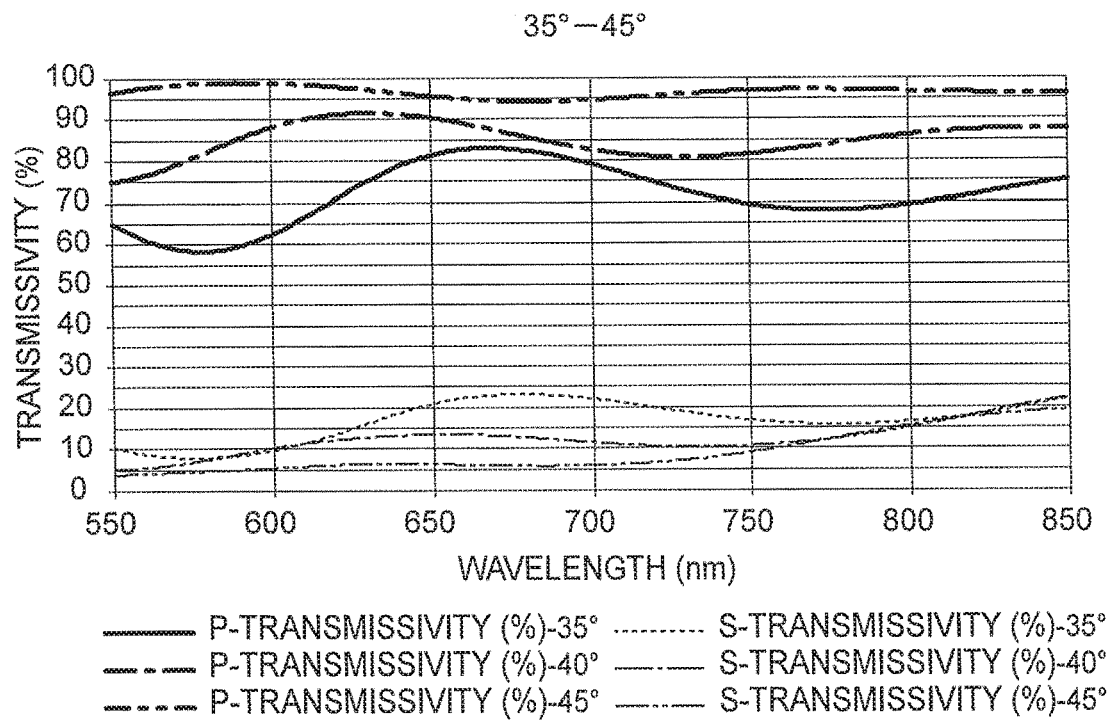
FIG. 14 is a diagram illustrating transmissivity characteristics of the polarized wave separation element according to the fifth example.

The following is an example of the fifth example. FIG. 13 illustrates the optical film thicknesses of the respective layers. FIG. 14 illustrates transmissivities of S-polarized light and the transmissivities of P-polarized light at incident angles of 35°, 40°, and 45° when the refractive index ni of the substrate is 1.65 in the present example.

Figure 15:
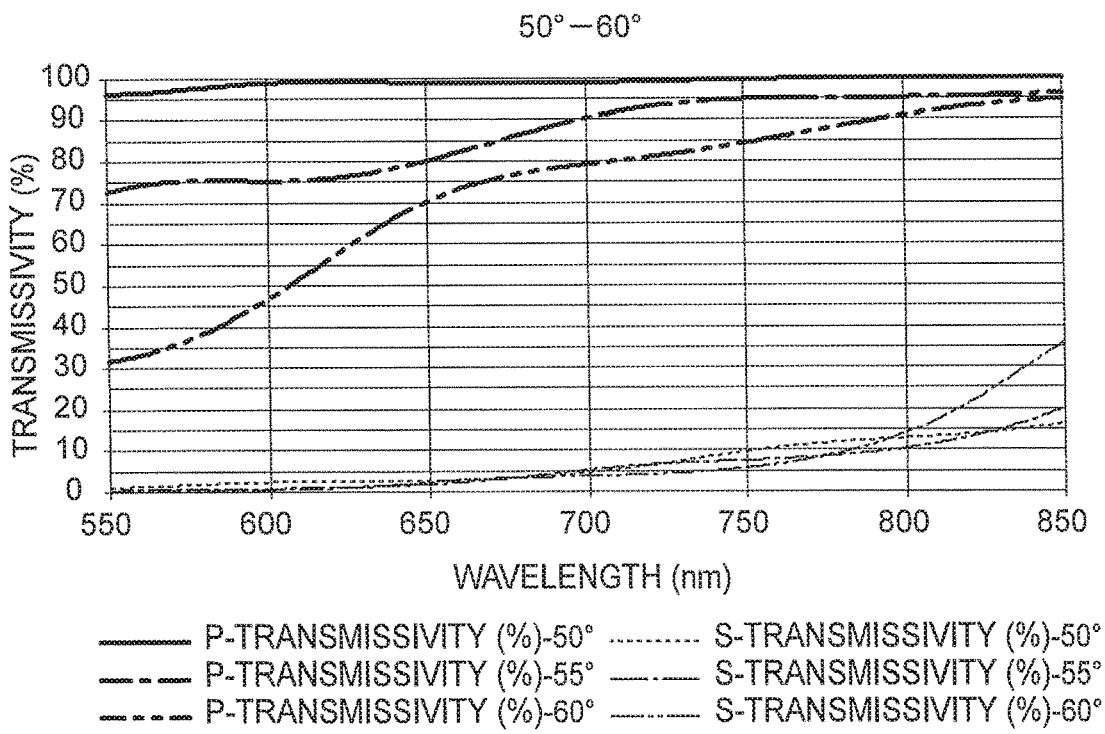
FIG. 15 is another diagram illustrating transmissivity characteristics of the polarized wave separation element according to the fifth example.

FIG. 15 illustrates transmissivities of S-polarized light and the transmissivities of P-polarized light at incident angles of 50°, 55°, and 60° in the present example.

As illustrated in FIG. 13, the polarized wave separation element according to the present example is a stacked structure of alternately stacked 16 layers and including a multilayer film formed by alternately stacking $SiO_2$ (refractive index nL=1.47) serving as a low refractive index substance and $Ta_2O_5$ (refractive index nH=2.24) serving as a high refractive index substance on a substrate.

$Ta_2O_5$ serving as the high refractive index substance is disposed in the second, the fourth, the sixth, the eighth, the tenth, the twelfth, the fourteenth, and the sixteenth layers in order from the upper substrate side illustrated in FIG. 13. $SiO_2$ serving as the low refractive index substance is disposed in the first, the third, the fifth, the seventh, the ninth, the eleventh, the thirteenth, and the fifteenth layers.

In order from the substrate, the first stack includes the first layer and the second layer. The second stack includes the third layer and the fourth layer. The third stack includes the fifth layer and the sixth layer. The fourth stack includes the seventh layer and the eighth layer. The fifth stack includes the ninth layer and the tenth layer. The sixth stack includes the eleventh layer and the twelfth layer. The seventh stack includes the thirteenth layer and the fourteenth layer. The eighth stack includes the fifteenth layer and the sixteenth layer. The present example includes eight stacks.

A ratio of H to L of the first stack is 0.85.

As described above, by merely setting L1 and the constants as the initial parameters, it is possible to easily design the film to the sixteenth layer without requiring any structural birefringent layer. In addition, as illustrated in FIG. 14 and FIG. 15, the structure produces the effect that good characteristics dealing with a wider incident angle are acquired with a simple multilayer film (stacked film) at a wavelength region of 550 nm to 850 nm.

Prism Element

Figure 16:
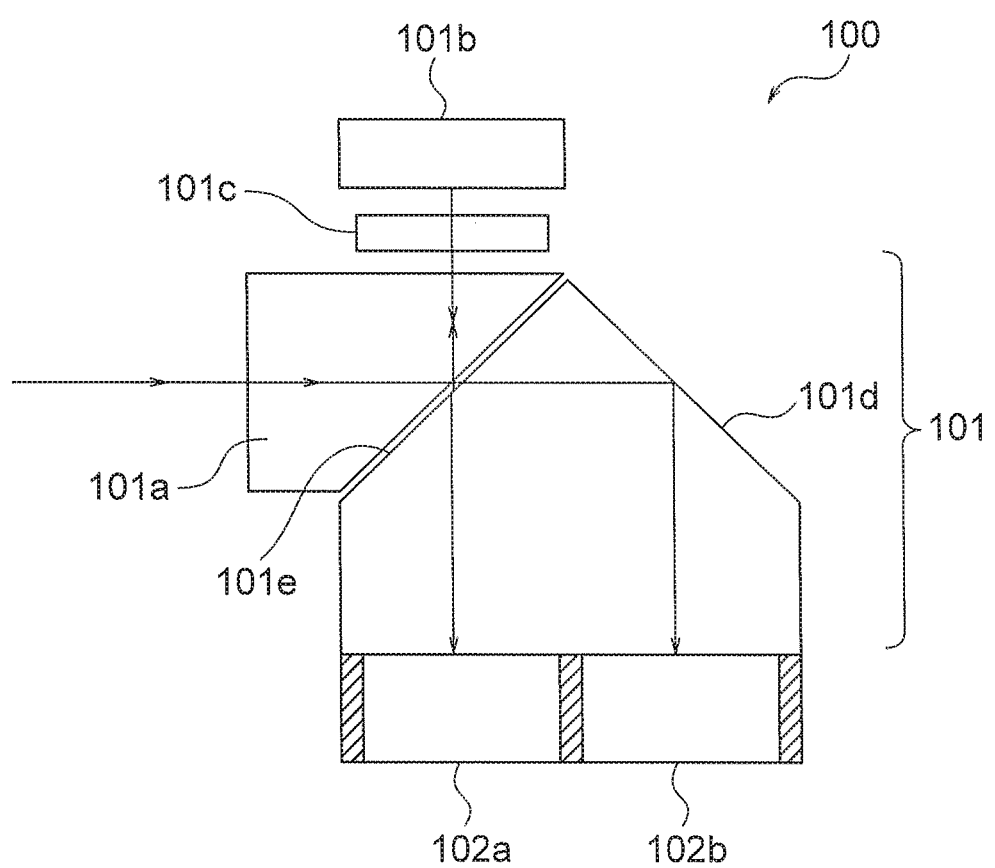
FIG. 16 is a diagram illustrating a structure of a prism element including the polarized wave separation element according to each of the examples.

The following is an explanation of the prism element including the polarized wave separation element according to each of the examples described above. FIG. 16 is a diagram illustrating a structure of a prism element 100 including the polarized wave separation element according to each of the examples.

The prism element 100 includes a prism unit 101, a λ/4 plate 101c, a reflection mirror 101b, and imaging elements 102a and 102b. The prism unit 101 further includes prisms 101a and 101d.

A polarized wave separation element 101e according to each of the examples described above is formed on a slope between the prism 101a and the prism 101d.

Among the light made incident on the prism 101a from the left side in the drawing, P-polarized light is transmitted through the polarized wave separation element 101e, reflected with the prism slope, and made incident on the imaging element 102b.

By contrast, among the light made incident on the prism 101a from the left side in the drawing, S-polarized light is reflected with the polarized wave separation element 101e toward the reflection mirror 101b. The light reflected with the reflection mirror 101b is transmitted through the λ/4 plate 101c twice to and fro, and the polarization direction thereof is converted into P polarization. The P-polarized light is transmitted through the polarized wave separation element 101e, and made incident on the imaging element 102a.

In this manner, the structure produces the effect that good characteristics dealing with a wider incident angle are acquired with a simple multilayer film (stacked film) at a wide wavelength region, in an element dividing the incident light into two optical paths.

Optical System

Figure 17:
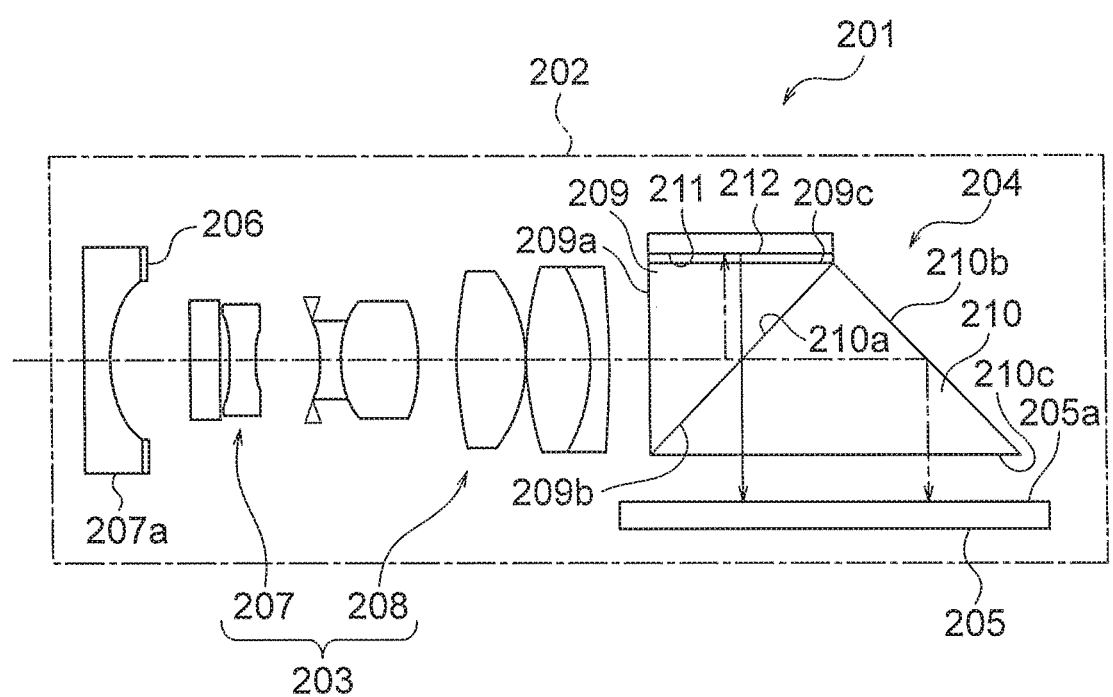
FIG. 17 is a diagram illustrating a configuration of an optical system according to a sixth example.

The following is an explanation of the optical system including the polarized wave separation element according to each of the examples described above. FIG. 17 is a diagram illustrating a configuration of the optical system according to a sixth example. The present embodiment is an optical system for an endoscope.

As illustrated in FIG. 17, an endoscope 201 according to the present embodiment includes an objective optical system 203 disposed in an insertion unit 202 to be inserted into a subject, an optical path division unit 204 dividing light condensed with the objective optical system 203 into two optical paths, an imaging element 205 simultaneously imaging the light divided with the optical path division unit 204 to acquire two images, and a flare diaphragm (shield portion) 206 partly cutting off the two optical images formed on the imaging element 205.

As illustrated in FIG. 17, the objective optical system 203 includes, in order from the object side, a negative lens group 207 including a plano-concave negative lens 207a of which a plane surface facing the object side, and a positive lens group 208. The light refracted with the negative lens group 207 from a wide visual field is condensed with the positive lens group 208, and thereafter output toward the optical path division unit 204 of the subsequent stage.

The optical path division unit 204 includes a combination of two small and large triangular prisms 209 and 210, a mirror 211, and a λ/4 plate 212. The first prism 209 includes a first surface 209a orthogonal to the optical axis of the objective optical system 203, a second surface 209b having an angle of 45° with respect to the optical axis, and a third surface 209c parallel with the optical axis. The second prism 210 includes a first surface 210a and a second surface 210b having an angle of 45° with respect to the optical axis of the objective optical system 203, and a third surface 210c parallel with the optical axis. The first surface 210a and the second surface 210b of the second prism 210 are orthogonal to each other.

The first surface 209a of the first prism 209 forms an incident surface on which the light beam made incident from the objective optical system 203 is made incident. The second surface 209b of the first prism 209 is in close contact with the first surface 210a of the second prism 210 without any space, with a polarized light separation film (not illustrated) interposed therebetween, to forma polarized light separation surface. The second surface 210b has a deflection surface that deflects the light travelling inside the second prism 210 along the optical axis direction by 90°.

The mirror 211 is disposed to hold the λ/4 plate 212 with the third surface 209c of the first prism 209. In this manner, the light beam emitted from the objective optical system 203 is made incident on the first surface 209a of the first prism 209 into the first prism 209, and thereafter separated into a P-polarized light component (transmission light) and an S-polarized light component (reflection light) on the polarized light separation surface (209b and 210a) on which the polarized light separation film is disposed.

The reflection light in the polarized light separation surface is transmitted through the λ/4 plate 212 from the third surface 209c of the first prism 209, deflected by 180° to be folded with the mirror 211, and transmitted through the λ/4 plate 212 again. Whereby, the polarization direction of the reflection light is rotated by 90°, and the reflection light is transmitted through the polarized light separation film, and emitted to the outside from the third surface 210c of the second prism 210. By contrast, the transmission light in the polarized light separation surface travels inside the second prism 210, deflected by 90° at the second surface 210b of the second prism 210, and emitted to the outside from the third surface 210c of the second prism 210.

The optical path lengths of the light beams travelling through the divided two optical paths from incidence on the first surface 209a of the first prism 209 into the first prism 209 to emission from the third surface 210c of the second prism 210 have a slight difference, for example, an optical path length difference d of several μm to several tens of μm. In this manner, the two optical images acquired with the two light beams made incident on the imaging element 205 disposed to face the third surface 210c of the second prism 210 have slightly different focus positions.

The imaging element 205 includes an imaging surface 205a opposed, with a parallel interval, to the third surface 210c of the second prism 210, to cause two light beams emitted from the third surface 210c of the second prism 210 to be simultaneously made incident thereon. Specifically, the imaging element 205 includes two rectangular light-receiving regions (effective pixel regions) in the whole pixel region of the imaging element 205 to simultaneously image the two optical images having different focus positions.

Whereby, the structure produces the effect that good characteristics dealing with a wider incident angle are acquired with a simple multilayer film (stacked film) at a wide wavelength region, in an optical system for an endoscope dividing the incident light into two optical paths.

Optical Apparatus

Figure 18:
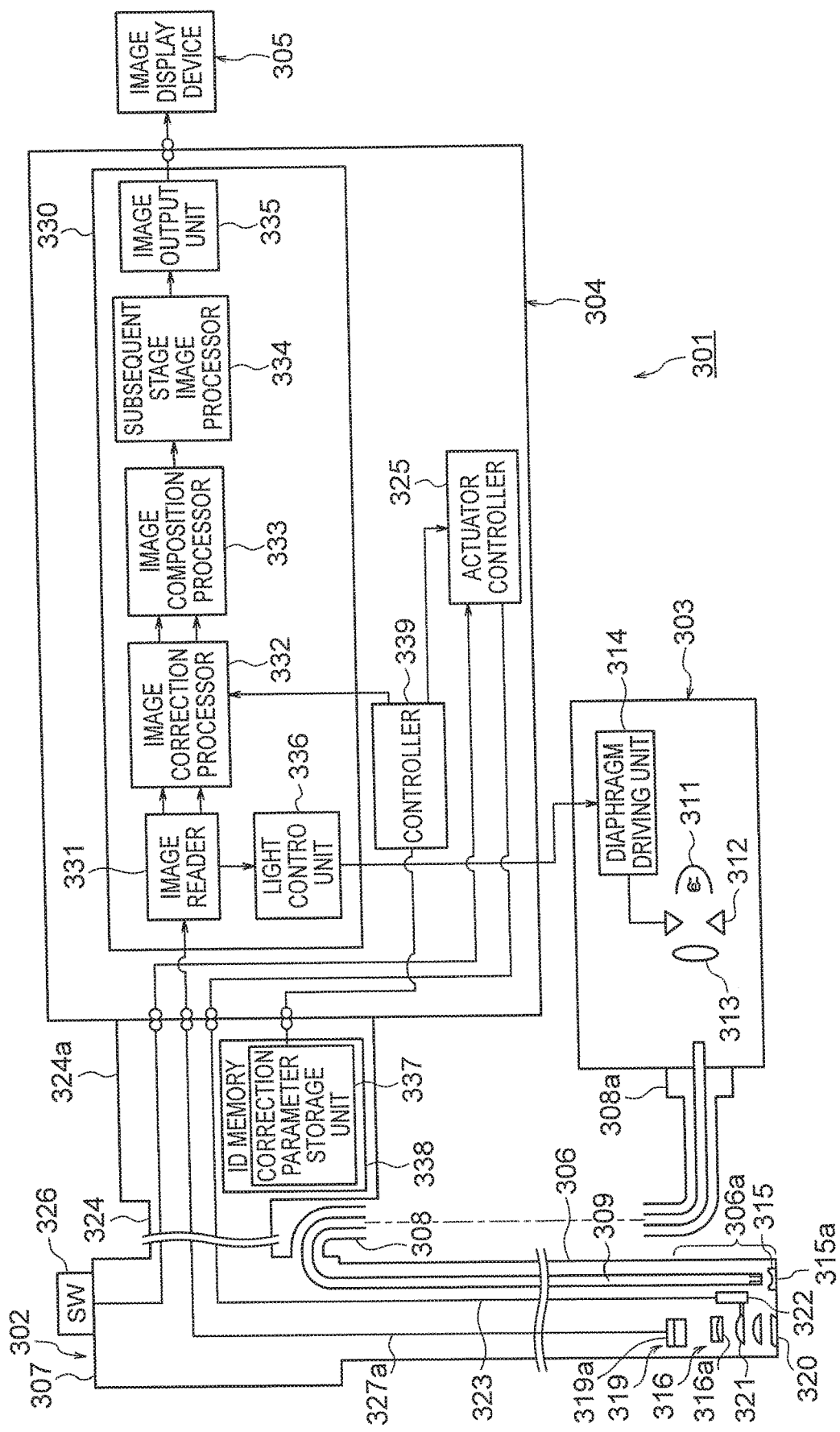
FIG. 18 is a diagram illustrating a configuration of an optical apparatus according to a seventh example.
Figure 19:
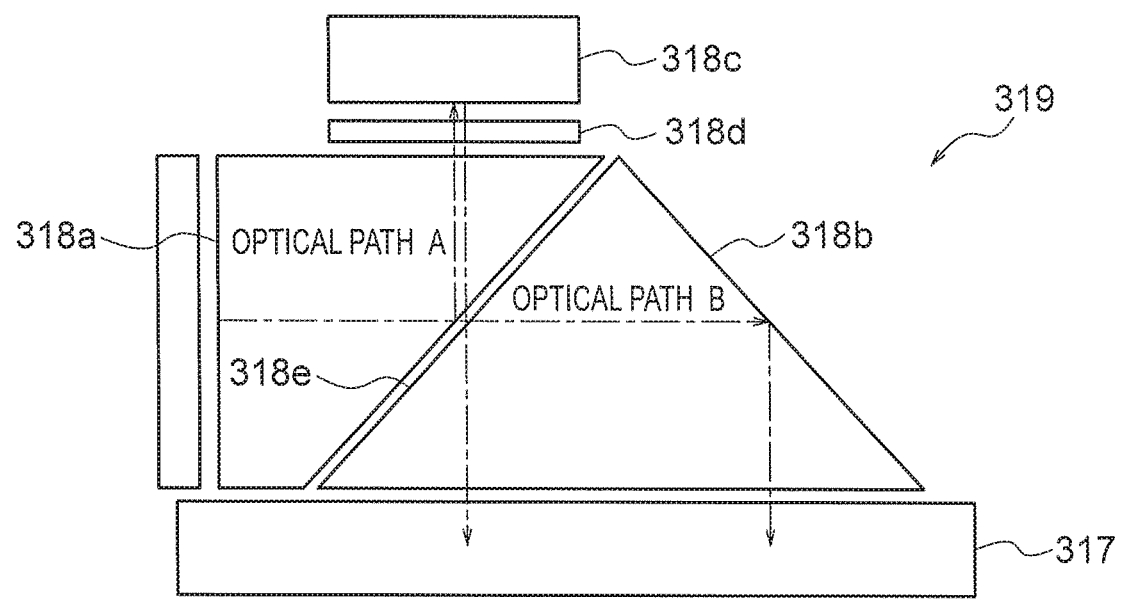
FIG. 19 is another diagram illustrating the configuration of the optical apparatus according to the seventh example.

The following is an explanation of the optical apparatus including the polarized wave separation element according to each of the examples described above. FIG. 18 is a diagram illustrating a configuration of an endoscope system serving as the optical apparatus according to the seventh example. FIG. 19 is a diagram illustrating a polarization beam splitter of the endoscope system. The endoscope system includes the objective optical system for an endoscope described above.

As illustrated in FIG. 18, an endoscope system 301 according to the present embodiment includes an endoscope 302 to be inserted into a subject, a light source device 303 configured to supply illumination light to the endoscope 302, a processor device 304 configured to perform image processing on an image signal acquired with an imaging element provided in the endoscope 302, and an image display device 305 configured to display the image signal having been subjected to predetermined image processing with the processor device 304 as an endoscope image.

The endoscope 302 includes an elongated insertion unit 306 to be inserted into the subject, an operating unit 307 provided at the rear end of the insertion unit 306, and a first cable 308 extending from the operating unit 307. A light guide 309 transmitting illumination light is inserted through the first cable 308.

A distal end portion 306a of the insertion unit 306 of the endoscope 302 is provided with an illumination lens 315 configured to diffuse the illumination light emitted from the light guide 309, an objective optical system 316 configured to acquire a subject image, and an imaging unit 319a configured to image the subject image. A light guide connector 308a provided at an end portion of the first cable 308 is detachably connected with the light source device 303 such that a rear end portion of the light guide 309 inserted through the first cable 308 serves as an incident end of the illumination light.

The light source device 303 includes therein a lamp 311, such as a xenon lamp, as the light source. The light source is not limited to the lamp 311, such as a xenon lamp, but a light-emitting diode (abbreviated as LED) may be used.

After the passage light quantity of white light generated with the lamp 311 is regulated with a diaphragm 312, the white light is condensed with a condenser lens 313, and made incident on (supplied to) the incident end surface of the light guide 309. The aperture of the diaphragm 312 is variable with a diaphragm driving unit 314.

The light guide 309 guides the illumination light made incident on the incident end (rea end side) from the light source device 303 to the distal end portion 306a side of the insertion unit 306. The illumination light guided to the distal end portion 306a is diffused with the illumination lens 315 disposed on the distal end surface of the distal end portion 306a from the outgoing end (distal end side) of the light guide 309, and emitted through an illumination window 315a, to illuminate the observation target region inside the subject.

The subject image of the illuminated observation target region is formed, with the objective optical system 316, on an imaging element 317 (FIG. 19) disposed behind the objective optical system 316 provided to an observation window 320 provided adjacent to the illumination window 315a of the distal end portion 306a.

The objective optical system 316 includes an optical element group 316a of a plurality of optical elements, a focus lens 321 serving as a focus switching mechanism to selectively focus on two observation regions of distant observation and close observation, and an actuator 322 configured to drive the focus lens 321.

The imaging unit 319a is provided on the rear end side of the insertion unit 306 of the objective optical system 316, and includes a polarization beam splitter 319 configured to divide the subject image into two optical images having different focuses, and the imaging element 317 configured to image two optical images and acquire two images.

As illustrated in FIG. 19, the polarization beam splitter 319 includes a first prism 318a, a second prism 318b, a mirror 318c, and a λ/4 plate 318d. Each of the first prism 318a and the second prism 318b includes a beam split surface having an inclination angle of 45° with respect to the optical axis, and the beam split surface of the first prism 318a is provided with a polarized light separation film 318e. The beam split surfaces of the first prism 318a and the second prism 318b are caused to abut against each other with the polarized light separation film 318e of each of the examples described above interposed therebetween, to form the polarization beam splitter 319. In addition, the mirror 318c is provided in the vicinity of an end surface of the first prism 318a, with the λ/4 plate 318d interposed therebetween, and the imaging element 317 is attached to an end surface of the second prism 318b.

The subject image from the objective optical system 316 is separated into a P-polarized light component (transmission light) and an S-polarized light component (reflection light) with the polarized light separation film 318e provided on the beam split surface in the first prism 318a, and separated into two optical images, that is, an optical image on the reflection light side and an optical image on the transmission light side.

The optical image of the S-polarized light component is reflected with the polarized light separation film 318e toward a side opposite to the imaging element 317, travels through an optical path A, is transmitted through the λ/4 plate 318d, and thereafter caused to be folded toward the imaging element 317 with the mirror 318c. The folded optical image is transmitted through the λ/4 plate 318d again. In this manner, the polarization direction of the optical image is rotated by 90°, and the optical image is transmitted through the polarized light separation film 318e and formed on the imaging element 317.

The optical image of the P-polarized light component is transmitted through the polarized light separation film 318e, travels through an optical path B, is reflected with a mirror surface provided opposite to the beam split surface of the second prism 318b causing the optical image to be folded perpendicularly toward the imaging element 317, and formed on the imaging element 317. The prism optical path is preset to generate a predetermined optical path difference, such as several tens of μm, between the optical path A and the optical path B, and two optical images having different focuses are formed on the light-receiving surface of the imaging element 317.

Specifically, the first prism 318a and the second prism 318b are arranged such that the optical path length on the reflection light side is shorter (smaller) than the optical path length (prism optical path length) on the transmission light side reaching the imaging element 317 in the first prism 318a so as to separate the subject image into two optical images having different focus positions.

The imaging element 317 is provided with two light-receiving regions (effective pixel regions), in the whole pixel region of the imaging element 317, to individually receive and image two optical images having different focus positions. The two light-receiving regions are arranged to coincide the respective imaging surfaces of the optical images to image two optical images. In addition, in the imaging element 317, one light-receiving region has a focus position relatively shifted (dislocated) from the other light-receiving region toward the near point side, and the other light-receiving region has a focus position relatively shifted from the one light-receiving region toward the far point side. Whereby, the two optical images having different focus positions are formed on the light-receiving surface of the imaging element 317.

The refractive indexes of the first prism 318a and the second prism 318b may be set different from each other to change the optical path lengths leading to the imaging element 317 and relatively shift the focus positions for the two light-receiving regions.

In addition, a correction pixel region to correct geometric shift between the two divided optical images is provided around the light-receiving region of the imaging element 317. The geometric shift of the optical images is canceled by suppressing a manufacturing error in the correction pixel region and performing correction by image processing in an image correction processor 332 described later.

The focus lens 321 is movable to two positions in the optical axis direction, and driven, with the actuator 322, to move between the two positions, that is, from one position to the other position, and from the other position to the one position. In the state in which the focus lens 321 is set to the front (object side) position, the focus lens 321 is set to focus on the subject of the observation region in distant observation. In the state in which the focus lens 321 is set to the rear position, the focus lens 321 is set to focus on the subject of the observation region in close observation.

The actuator 322 is connected with a signal line 323 inserted through the insertion unit 306, and the signal line 323 is further inserted through a second cable 324 extended from the operating unit 307. A signal connector 324a at an end portion of the second cable 324 is detachably connected with the processor device 304, and the signal line 323 is connected with an actuator controller 325 provided in the processor device 304.

The actuator controller 325 also receives, for example, a switching operation signal from a switching operation switch 326 provided in the operating unit 307 of the endoscope 302. The actuator controller 325 applies a drive signal to electrically drive the actuator 322 in accordance with an operation of the switching operation switch 326, to move the focus lens 321.

The switching operation unit configured to generate a switching operation signal is not limited to the switching operation switch 326, but may be a switching operation lever or the like. A focus switching mechanism includes the focus lens 321, the actuator 322, and the actuator controller 325. In the meantime, the focus unit in the present embodiment is not limited to the means for moving the focus lens in the optical axis direction described above. For example, the focus unit may be means for switching the focus by inserting and detaching a lens and/or a filter in and from the objective optical system.

The imaging element 317 is connected with a signal line 327a inserted through the insertion unit 306, the operating unit 307, and the second cable 324, and the signal connector 324a is connected with the processor device 304. In this manner, the imaging element 317 is connected with an image processor 330 serving as an image processing unit provided in the processor device 304.

The image processor 330 includes an image reader 331 configured to read respective images relating to the two optical images imaged with the imaging element 317 and having different focus positions, an image correction processor 332 configured to perform image correction on the two images read with the image reader 331, and an image composition processor 333 configured to perform image composition processing to combine the two corrected images.

The image correction processor 332 corrects the images relating to the two optical images formed on the two respective light-receiving regions of the imaging element 317 such that their differences other than the focus difference are substantially unified. Specifically, the image correction processor 332 corrects the two images such that the relative positions, angles, and magnifications in the optical images of the two images are substantially unified.

When the subject image is separated into two images to form two images on the imaging element 317, a geometrical difference may occur. Specifically, the respective optical images formed on the two respective light-receiving regions of the imaging element 317 may have relative differences in magnification, position, angle, that is, rotational direction. Although it is difficult to completely cancel these differences in manufacturing or the like, when the quantities of differences increase, there are cases where the composite image is a double image, or unnatural unevenness in brightness or the like occurs. For this reason, the geometrical difference and brightness difference described above are corrected in the image correction processor 332.

The image composition processor 333 selects an image with a relatively high contrast in corresponding predetermined regions between two images corrected with the image correction processor 332, to generate a composite image. Specifically, the image composition processor 333 compares the contrasts in the spatially equal pixel regions in the two images, and selects the pixel region with the relatively higher contrast, to generate a composite image serving as one image composed from the two images. When a contrast difference between the equal pixel regions of the two images is small or substantially equal between them, a composite image is generated by composite image processing of performing addition to the pixel regions with a predetermined weight.

The image processor 330 also includes a subsequent image processor 334 configured to perform subsequent stage image processing, such as color matrix processing, edge enhancement, and gamma correction, on one image composed with the image composition processor 333, and an image output unit 335 configured to output the image having been subjected to subsequent stage image processing, and the image output from the image output unit 335 is output to the image display device 305.

The image processor 330 also includes a light control unit 336 configured to generate a light control signal to control light to standard brightness from the image read from the image reader 331, and outputs the light control signal generated by the light control unit 336 to the diaphragm driving unit 314 of the light source device 303. The diaphragm driving unit 314 controls the aperture of the diaphragm 312 to maintain the standard brightness in accordance with the light control signal.

In addition, the present embodiment is provided with a correction parameter storage unit 337 storing therein (information of) correction parameters used when the image is corrected in the image correction processor 332.

The endoscope 302 includes an ID memory 338 storing therein endoscope identification information (endoscope ID) peculiar to the endoscope 302, and provided with the correction parameter storage unit 337 storing therein correction parameters corresponding to the endoscope 302 when peculiar correction parameters exists to perform correction in the endoscope 302.

For example, a geometrical difference, a difference in brightness, or a difference in color described above may occur in images relating to two optical images, according to the shading characteristics of the optical path separation element or the imaging element and the wavelength characteristics of the λ/4 plate. When such a difference exists between the two images, unnatural unevenness in brightness and/or unevenness in color occurs in the composite image. To correct it, the correction parameters are determined in consideration of the characteristics of the optical path division element, the imaging element, and/or the λ/4 plate.

The image correction processor 332 may receive preset correction parameters from the correction parameter storage unit 337 to perform correction. For example, when the product is shipped from the factory, the shift quantity is set in advance in the correction parameter storage unit 337. When the endoscope 302 is connected with the image processor 330, the image correction processor 332 is enabled to recognize connection of the endoscope 302, and call the corresponding correction parameters from the correction parameter storage unit 337 to perform correction.

When no peculiar correction parameters to perform correction exist, it is unnecessary to provide the correction parameter storage unit 337. In addition, the correction parameter storage unit 337 is not limited to being provided inside the ID memory 338, but may be provided in a memory different from the ID memory 338.

A controller 339 of the image processor 330 recognizes presence/absence of correction with the endoscope ID provided on the endoscope 302 side. When correction is present, the controller 339 reads the correction parameters from the correction parameter storage unit 337 in the ID memory 338 stored in the endoscope 302, and transmits the correction parameters to the image correction processor 332.

The image correction processor 332 performs image correction corresponding to the imaging unit 319a mounted on the endoscope 302 on the basis of the correction parameters transmitted from the controller 339.

The image correction processor 332 also performs image correction, such as correction of a difference in magnification, and correction of a difference in position, which are described above, using the two images or one of the images as a reference picture or a reference image, with the correction parameters. For example, when a difference in magnification occurs in the two images, the difference may be caused by the specification of the objective optical system 316.

When the size of the objective optical system 316 is set to a relatively small size, there are cases of performing design to disorder telecentricity and cause the light beam to the imaging element 317 to be made incident obliquely. For example, supposing that the angle made with respect to the optical axis is an incident angle, the clockwise direction is the positive, and the counterclockwise direction is the negative, a design to achieve a negative incident angle is performed.

When the focus position is shifted in the objective optical system with the disordered telecentricity as described above, a difference in magnification occurs between the two images.

In the case of the specification in design as described above, the shift quantity is stored in advance in the correction parameter storage unit 337. When the target endoscope 302 is connected with the processor device 304, the endoscope 302 is recognized, and the corresponding correction parameters are called from the correction parameter storage unit 337, to perform correction.

In assembly of the imaging unit 319a, there are cases where the relative pixel positions of the two images are minutely shifted. In this case, the shift quantity in manufacturing is stored in the correction parameter storage unit 337, and the shift is corrected in the image correction processor 332. In correction of shift of the position, for example, processing to correct the reading positions of the two images is performed such that the relative positions of the image imaged in one light-receiving region of the imaging element 317 and the image imaged in the other light-receiving region agree with each other. After shift of the position is corrected, the images are output to the image composition processor 333.

Instead of performing correction with the preset correction parameters in the present embodiment, correction may be performed with an adjustment reference chart prepared separately when the endoscope is used. For example, the reference chart may be disposed in a desired position in the distal end portion 306a of the endoscope 302, and a shift between the two images with respect to the reference chart may be read from the image correction processor 332, to correct the shift.

In this manner, in the endoscope system, this structure produces the effect that two images having good characteristics and corresponding to a wider incident angle are acquired with a simple multilayer film (stacked film), and the two images are combined to acquire an image with a large depth of field in a wide wavelength region.

The polarized wave separation element described above may simultaneously satisfy a plurality of structures. Doing so is preferable in acquisition of a good polarized wave separation element, an optical system, and an optical apparatus. In addition, a preferable combination of structures is freely selected. In addition, with respect to each of the conditional expressions, only the upper limit value or only the lower limit value of the numerical range of a more limited conditional expression may be limited.

Various embodiments of the present invention have been described above, but the present invention is not limited to these embodiments. An embodiment formed by properly combining the structures of these embodiments within a range not departing from the gist thereof also falls within the scope of the present invention.

As described above, the present invention is useful for a polarized wave separation element, an optical system, and an optical apparatus dealing with a wider incident angle with a simple multilayer film (stacked film) without requiring any structural birefringent layer.

Advantageous Effects of Invention

The present invention produces the effect of enabling provision of a polarized wave separation element, an optical system, and an optical apparatus dealing with a wider incident angle with a simple multilayer film (stacked film) without requiring any structural birefringent layer.

What is claimed is:

1. A polarized wave separation element comprising:
   a first substrate;
   a second substrate; and
   a multilayer film between the first substrate and the second substrate, the multilayer film being formed by alternately stacking a relatively low refractive index substance and a relatively high refractive index substance,
   wherein:
   the multilayer film comprises plural stacks, each of the plural stacks comprising a pair of a low refractive index substance layer and a high refractive index substance layer adjacent to the low refractive index substance layer,
   at least half of the plural stacks in the multilayer film satisfy the following conditional expression (1):

$$H1{:}L1 = Hn{:}Ln \qquad (1)$$

a plurality of the plural stacks in the multilayer film satisfy the following conditional expressions (2a) and (2b):

$$Hn = H1 \times (a + (n-2) \times b) \qquad (2a)$$

$$Ln = L1 \times (a + (n-2) \times b) \qquad (2b), \text{ and}$$

a stack among the plural stacks in the multilayer film satisfies the following conditional expressions (3a) and (3b):

$$Hn = H1 \times (a+(n-2) \times b) \times c1 \quad (3a)$$

$$Ln = L1 \times (a+(n-2) \times b) \times c2 \quad (3b)$$

where,
an nth stack from the first substrate is named as an nth stack,
Ln is an optical film thickness of the low refractive index substance of the nth stack,
Hn is an optical film thickness of the high refractive index substance of the nth stack,
a is a constant having a value between 1.1 and 1.3,
b is a constant having a value between 0.3 and 0.6, and
c1 and c2 are constants each having a value between 0.8 and 1.

2. The polarized wave separation element according to claim 1, wherein a stack among the plural stacks in the multilayer film satisfies the following conditional expressions (4a) and (4b):

$$Hn = H1 \times (a+(n-2) \times b) \times d1 \quad (4a)$$

$$Ln = L1 \times (a+(n-2) \times b) \times d2 \quad (4b)$$

where d1 and d2 are constants each having a value equal to or larger than 0.7 and smaller than 1.2, and "d1≠d2" and "1.8<d1+d2<2.2" are satisfied.

3. The polarized wave separation element according to claim 1, wherein a stack among the plural stacks in the multilayer film satisfies the following conditional expression (5):

$$Hn = H1 \times (a+(n-1) \times b) \quad (5).$$

4. The polarized wave separation element according to claim 1, wherein:
the multilayer film comprises eight stacks including a first stack, a second stack, a third stack, a fourth stack, a fifth stack, a sixth stack, a seventh stack, and an eighth stack stacked in order from the first substrate,
the second stack, the third stack, the fourth stack, the fifth stack, and the eighth stack satisfy the conditional expression (1),
the second stack, the third stack, and the fourth stack satisfy the conditional expressions (2a) and (2b),
the fifth stack satisfies the conditional expressions (3a) and (3b),
the sixth stack and the seventh stack satisfy the following conditional expressions (4a) and (4b):

$$Hn = H1 \times (a+(n-2) \times b) \times d1 \quad (4a)$$

$$Ln = L1 \times (a+(n-2) \times b) \times d2 \quad (4b)$$

where d1 and d2 are constants each having a value equal to or larger than 0.7 and smaller than 1.2, and "d1≠d2" and "1.8<d1+d2<2.2" are satisfied, and
the eighth stack satisfies the following conditional expression (5):

$$Hn = H1 \times (a+(n-1) \times b) \quad (5).$$

5. The polarized wave separation element according to claim 4, wherein the constant a is 1.23.

6. The polarized wave separation element according to claim 1, wherein:
the multilayer film has a structure in which two types of dielectrics of the high refractive index substance and the low refractive index substance are stacked between a pair of the first substrate and the second substrate,
a transmissivity Tp of a P-polarized light component and a transmissivity Ts of a S-polarized light component at an incident angle of 35° to 60° in the multilayer film have a relation of Tp>Ts, and
a difference between the transmissivity Tp and the transmissivity Ts is at least 30%.

7. The polarized wave separation element according to claim 1, wherein:
the multilayer film has a structure in which two types of dielectrics of the high refractive index substance and the low refractive index substance are stacked between a pair of the first substrate and the second substrate,
a transmissivity Tp of a P-polarized light component and a transmissivity Ts of a S-polarized light component at an incident angle of 35° to 60° in the multilayer film have a relation of Tp>Ts,
a difference between the transmissivity Tp and the transmissivity Ts is at least 30%, and
the multilayer film has a continuous wavelength range of at least 200 nm in which a difference in level of the transmissivity within a wavelength range of 100 nm is at most 35% in each of the transmissivity Ts and the transmissivity Tp.

8. The polarized wave separation element according to claim 1, wherein:
the multilayer film has a structure in which at least two types of dielectrics of the high refractive index substance and the low refractive index substance are stacked between a pair of the first substrate and the second substrate, and
a bonding agent exists between a surface of one of the first substrate and the second substrate and the multilayer film.

9. The polarized wave separation element according to claim 1, wherein each of the first substrate and the second substrate is transparent with respect to target light and formed from a material selected from optical glass, a semiconductor substrate, and a synthetic resin.

10. The polarized wave separation element according to claim 1, wherein at least two materials are selected from TiO, $TiO_2$, $Y_2O_3$, $Ta_2O_5$, ZrO, $ZrO_2$, Si, $SiO_2$, $HfO_2$, Ge, $Nb_2O_5$, $Nb_2O_6$, $CeO_2$, $Cef_3$, ZnS, ZnO, $Fe_2O_3$, $MgF_2$, $AlF_3$, $CaF_2$, LiF, $Na_3AlF_6$, $Na_5AL_3F_{14}$, $Al_2O_3$, MgO, LaF, $PbF_2$, $NdF_3$, and a mixture thereof, as materials of dielectrics of the high refractive index substance and the low refractive index substance.

11. The polarized wave separation element according to claim 1, wherein, as a method for stacking at least two dielectrics of the high refractive index substance and the low refractive index substance, one of physical vapor deposition, comprising vacuum deposition, sputtering, and ion plating, resistance heating deposition, electron beam heating deposition, high-frequency heating deposition, laser beam heating deposition, ionization sputtering, ion beam sputtering, plasma sputtering, ion assist, and radical assist sputtering, is adopted.

12. An optical system comprising the polarized wave separation element according to claim 1.

13. An optical apparatus comprising the optical system according to claim 12.

* * * * *